2,962,223
WINDSHIELD WASHING ATTACHMENT FOR MOTOR VEHICLES

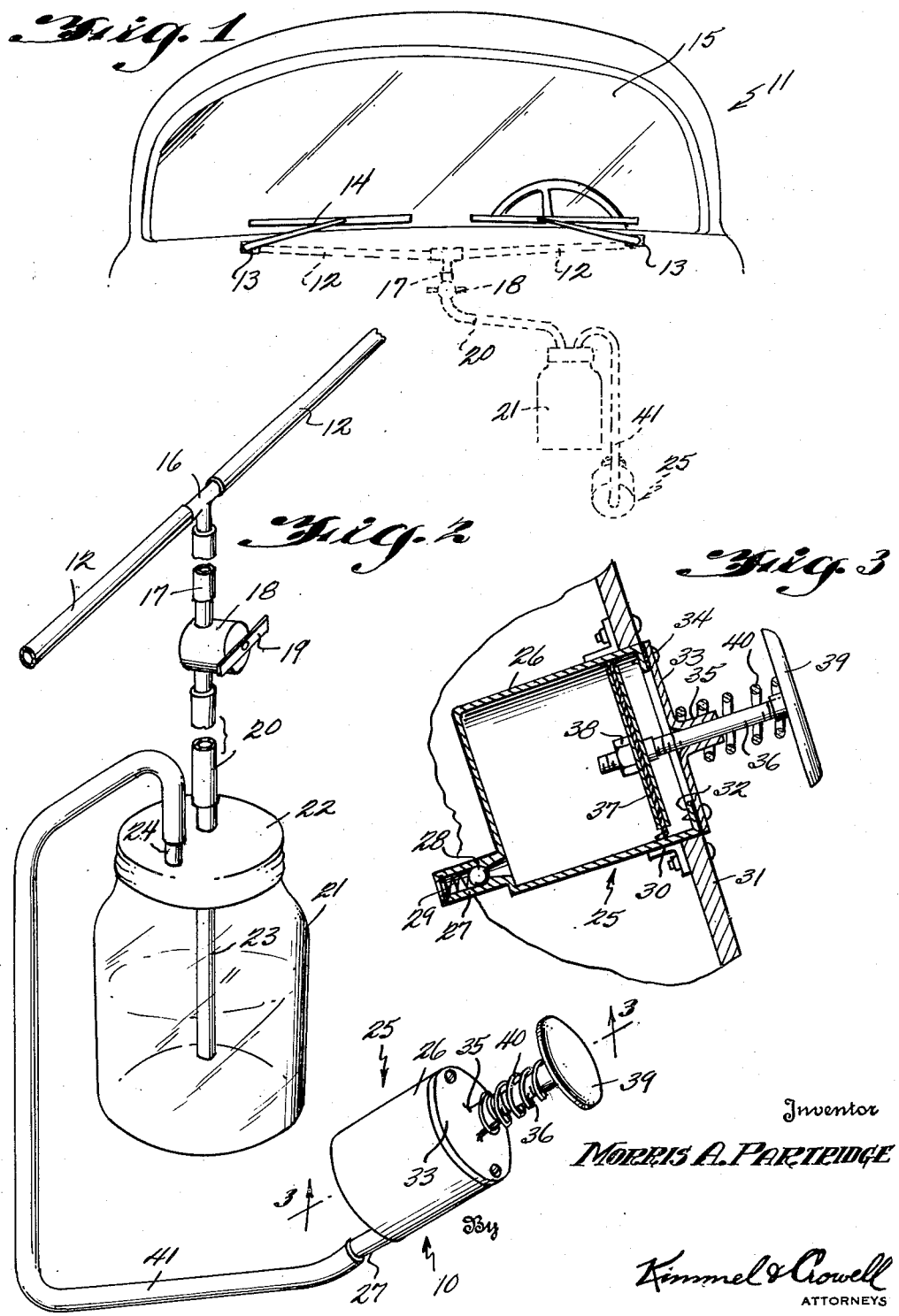

Morris A. Partridge, 208 Cliffdale, Dallas 11, Tex.

Filed Aug. 6, 1959, Ser. No. 832,024

1 Claim. (Cl. 239—284)

The present invention relates to a windshield washing attachment for motor vehicles.

The primary object of the invention is to provide a windshield washing attachment for motor vehicles which is actuated by a foot powered pump mounted on the vehicle.

Another object of the invention is to provide a windshield washer of the class described above which utilizes a conventional mason jar as the water reservoir to permit its ready replacement when lost or broken.

A further object of the invention is to provide a windshield washing attachment for motor vehicles which is inexpensive to manufacture, simple to install and which effectively directs a spray of water onto the windshield as required for washing purposes.

Other objects and advantages will become apparent in the following specification when considered in light of the attached drawings, in which:

Figure 1 is a front elevation of the invention shown attached to a motor vehicle;

Figure 2 is a perspective view of the invention shown detached from the motor vehicle; and Figure 3 is an enlarged fragmentary vertical sectional view taken along the line 3—3 of Figure 2, looking in the direction of the arrows with the pump shown attached to the floor board of the motor vehicle.

Referring now to the drawings in detail wherein like reference characters indicate like parts throughout the several figures, the reference numeral 10 indicates generally a windshield washing attachment for a motor vehicle, generally indicated at 11.

The windshield washing attachment 10 is secured to a motor vehicle 11 and has a pair of oppositely extending flexible tubes 12 connected to oppositely disposed fittings 13 of conventional windshield wipers 14. The conventional fittings 13 are provided with nozzles (not shown) for directing fluid against the windshield 15. A T 16 connects the adjacent ends of the flexible tubes 12 and has a depending flexible tube 17 connected thereto. A valve 18 is connected to the flexible tube 17 and has a handle 19 secured thereto. The valve 18 is positioned so that the handle 19 may be arranged conveniently to the driver of the motor vehicle. A flexible tube 20 is connected to the valve 18 oppositely of the flexible tube 17 and extends in depending relation thereto.

A glass mason jar 21 having an open mouth and a threaded neck extending about the mouth is suitably supported in the motor vehicle 11 and has a threaded cap 22 detachably secured to the neck. A water discharge pipe 23 extends through the cap 22 in sealed relation thereto to a point adjacent the bottom of the mason jar 21. The upper end of the conduit 23 extends above the cap 22 and has the lower end of the flexible tube 20 secured thereto. A relatively short conduit 24 is fixedly secured to the cap 22, providing an air inlet for the mason jar 21.

A pump, generally indicated at 25, has a cylindrical housing 26 with an outlet fitting 27 projecting from the lower end thereof. A ball check valve 28 is mounted in the outlet fitting 27 and is normally maintained in closed position by a coil spring 29. A bracket 30 is secured to the housing 26 and is, in turn, secured to the floor boards 31 of the motor vehicle 11, mounting the housing 26 therebelow. The upper end of the housing 26 has a radially inwardly extending annular flange 32 integrally formed thereon with a cover 33 secured to the flange 32 by a plurality of securing elements 34. The cover 33 has a central hollow bushing 35 projecting outwardly therefrom oppositely of the housing 26. A shaft 36 is slidably mounted in the bushing 35 and has a piston 37 secured to the inner end thereof by a nut 38 so that the piston 37 can be reciprocated in the housing 26. A foot pedal 39 is secured to the opposite end of the shaft 36 and a coil spring 40 encompasses the shaft 36, engaging at one end the cover 33 and at the opposite end the foot pedal 39 to normally maintain the piston 37 at the end of the housing 26 opposite the outlet fitting 27.

A flexible tube 41 connects the conduit 24 to the outlet fitting 27 so that air may be pumped into the mason jar 21 by the pump 25.

In the use and operation of the invention, water is placed in the mason jar 21 and the pump 25 is actuated to pump air into the mason jar building up pressure therein. The valve 18 is then operated by means of the handle 19 and the air pressure in the mason jar 21 will cause water therein to flow upwardly through the tube 23 and finally outwardly through the fittings 13. As the pressure in the mason jar 21 decreases it is replenished by again actuating the pump 25 with the foot.

It should be noted that with the present invention pressure is produced directly in the storage tank, eliminating the necessity of having a separate pressure compartment into which the water must be drawn before applying pressure thereto. The instant invention also eliminates the use of metal parts submerged in the water, thereby eliminating rust conventionally found in other systems. Applicant's invention is extremely simple in nature and operates with a minor number of working parts, reducing both the expense and the possibilities of the device needing repair.

In applicant's invention the length of time that the water is sprayed on the windshield is varied in accordance with the movement of the handle 19 so that the driver may spray the windshield to the degree necessary to correct the conditions encountered.

Having thus described the preferred embodiments of the invention, it sould be understood that numerous structural modifications and adaptations may be resorted to without departing from the scope of the appended claim.

What is claimed is:

A windshield washing attachment for motor vehicles of the type having windshield wiper fittings incorporating washer spray nozzles therein comprising a reservoir embodying a jar having an open mouth and a threaded neck extending about said mouth, a threaded cap detachably secured to said neck, conduit means extending through said cap in sealed relation thereto connecting said reservoir to said nozzles, a valve in said conduit means, a foot operated pump mounted on the floor board of the motor vehicle, conduit means extending through said cap in sealed relation thereto connecting said pump to said reservoir to convey air under pressure directly from said pump to said reservoir to move water through said conduit means with said valve in open position, said pump comprising a housing, means securing said housing to said floor boards, an outlet fitting secured to said housing, a check valve mounted in said outlet fitting, a piston mounted for reciprocation in said housing, and a foot pedal secured to said piston for moving said piston in said housing to pump air.

References Cited in the file of this patent

UNITED STATES PATENTS

| | | |
|---|---|---|
| 2,001,338 | Wiseman | May 14, 1935 |
| 2,114,558 | Dismukes | Apr. 19, 1938 |
| 2,673,762 | Doyle | Mar. 30, 1954 |